March 8, 1932.  E. F. CARTER  1,848,824
SYSTEM OF DISTRIBUTION
Filed April 18, 1925
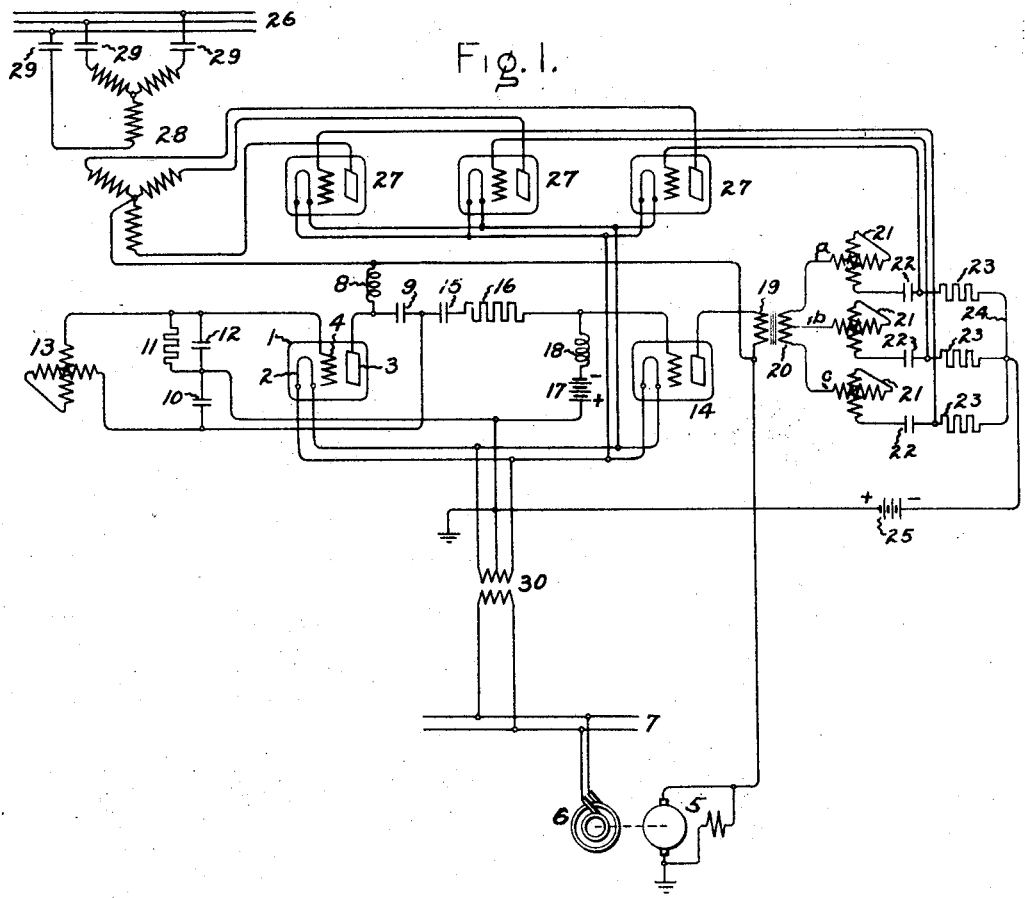
Fig. 1.
Fig. 2.
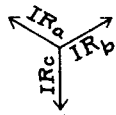
Inventor:
Emmett F. Carter,
by *Alexander S. ...*
His Attorney.

Patented Mar. 8, 1932

1,848,824

UNITED STATES PATENT OFFICE

EMMETT F. CARTER, OF SCHENECTADY, NEW YORK, ASSIGNOR TO GENERAL ELECTRIC COMPANY, A CORPORATION OF NEW YORK

SYSTEM OF DISTRIBUTION

Application filed April 18, 1925. Serial No. 24,203.

My present invention relates to carrier current systems.

It is an object of my invention to provide, in a carrier current system, means whereby polyphase radio frequency energy may be supplied to a polyphase system of low frequency power distribution.

The novel features which I believe to be characteristic of my invention are set forth with particularity in the appended claims. My invention itself, however, both as to its organization and method of operation will best be understood by reference to the following description taken in connection with the accompanying drawings in which Fig. 1 shows diagrammatically one way in which single phase radio frequency energy may be converted and supplied to each phase of a 3-phase system of distribution. Fig. 2 shows the relationship of the currents produced in the polyphase circuit connected to the secondary winding of a single phase transformer.

Referring to the drawings, I have indicated at 1 a thermionic oscillation generator comprising the usual cathode 2, anode 3 and grid 4. Current for the operation of the anode or plate circuit is supplied by a direct current high voltage generator 5 which is driven by an alternating current motor 6 supplied from a source of power 7. One of the terminals of generator 5 is connected to plate 3 through an inductance 8 which prevents high frequency currents from flowing through the source of supply 5. Anode 3 is connected through a blocking condenser 9 and a condenser 10 to the cathode 2. Grid 4 is connected through a circuit comprising a grid leak 11 and a condenser 12, to cathode 2. A variable inductance 13 is connected in shunt to condensers 10 and 12 and forms with them an oscillating circuit which determines the frequency of the single phase electromotive force produced by the generator 1.

The output circuit of the transmitter or oscillation generator 1 is connected to the grid of an amplifier tube 14 by means of a coupling capacity 15 and a resistance 16. A battery or other source of potential 17 is connected to the grid of amplifier 14 through an inductance 18 and serves to provide the grid with a negative bias. Resistance 16 is of such value that when the power amplifier is over-excited and draws grid current, there is a voltage drop which has a tendency to flatten the exciting wave and give in effect a substantially rectangular wave form to the grid excitation wave.

The output circuit of amplifier 14 is connected to the high voltage source 5 through the primary winding 19 of a single phase transformer. The secondary winding 20 of the single phase transformer is connected at its terminals and mid-point to a polyphase circuit having three branches $a$, $b$ and $c$, each branch containing a variable inductance 21, a condenser 22 which may be variable and a resistance 23.

By tuning the three branches of the polyphase circuit so that the inductance and capacity units have the proper values, the voltages across the resistances 23 as well as the currents in resistance 23 may be represented by the vector diagram shown in Fig. 2. In other words, the branch $a$ is tuned so that the capacitive reactance of line $a$ is sufficient to cause current in the branch $a$ to lead the impressed voltage by 60°. Branch $b$, is so tuned that the inductive reactance of line $b$ is sufficient to cause the current in circuit $b$ to lag 60° behind the impressed voltage. Branch $c$ is tuned so that the impressed voltage and current are in phase.

The branch circuits $a$, $b$ and $c$ of the polyphase circuit are connected together at 24 and grounded through battery 25, and are connected to a system of distribution 26 by means of a plurality of thermionic valves or amplifier units 27 and a polyphase transformer 28. The effect of these valves, or amplifiers, of course, is to render the impedances of the polyphase circuit $a$, $b$, $c$, substantially independent of the impedance of the load 26. In this way a more satisfactory balance between the electromotive forces of the different phases of the load may be had. Battery 25 supplies a negative bias to each grid of the amplifier units 27. The output circuit of each amplifier 27 includes one leg of the primary winding of transformer 28. The secondary windings of transformer 28 are connected to the system of distribution 26 through coupling condensers 29.

The cathode elements of transmitter 1 and amplifiers 14 and 27 are supplied with energy through a transformer 30 which is connected to the source of power 7.

When electromotive forces, having the phase relation indicated in Fig. 2, are impressed on the grid members of amplifiers 27, a polyphase electromotive force is produced in the primary windings of transformer 28, and a polyphase electromotive force is induced in the secondary windings of transformer 28 and is impressed on the system of distribution 26.

The particular manner of producing the single phase radio frequency electromotive force forms no part of my present invention. Various means may be employed to produce the required high frequency electromotive force to energize winding 19.

While I have shown and described but one modification of my invention it will be apparent that many modifications in the circuit arrangement may be employed without departing from the scope of my invention as set forth in the appended claims.

What I claim as new and desire to secure by Letters Patent of the United States, is:—

1. In combination, a single phase transformer comprising primary and secondary windings, means for supplying single phase high frequency current to said primary winding, and means including a plurality of tuned circuits for converting said single phase current into polyphase currents, each of said circuits being connected to a different point on said secondary winding.

2. In combination, a single phase radio frequency source of electromotive force, a single phase transformer having a primary winding connected to said source and a secondary winding inductively related to said primary winding, and means including a plurality of inductance units and a plurality of capacity units for converting said single phase electromotive force to polyphase radio frequency electromotive forces, said inductance units and capacity units being associated with said secondary winding.

3. In combination, a single phase transformer having a primary winding, and a secondary winding inductively related to said primary winding, means for supplying a single phase radio frequency electromotive force to said primary winding, a polyphase circuit having a plurality of branches, said branches being conductively connected to said secondary winding and means including a variable impedance for controlling the phase relation of the currents in the branches of said polyhase circuits.

4. In combination a polyphase load, means for supplying radio frequency polyphase currents to said load, said means including a single phase transformer having primary and secondary windings, a high frequency single phase source of electromotive force connected to said primary winding, a polyphase circuit connected to said secondary winding, means for controlling the phase relation of the electromotive forces in the branches of said polyphase circuits, and a connection between each branch of said polyphase circuit and said load.

5. In combination, a polyphase load and means for supplying radio frequency currents to said load, said means including a single phase transformer having primary and secondary windings, a high frequency single phase source of electromotive force connected to said primary winding, a polyphase circuit connected to said secondary winding, an inductance and capacity unit in each branch of said polyphase circuit for controlling the phase relation of the electromotive forces in said branches and a connection between each branch of said circuit and said load.

6. In combination, a polyphase load, means for supplying radio frequency polyphase currents to said load, said means including a single phase transformer having primary and secondary windings, a high frequency single phase source of current connected to said primary winding, a polyphase circuit connected to said secondary winding, means for controlling the phase relation of the currents in said polyphase circuit, said means being subject to variation due to impedance changes in said circuit a polyphase transformer having a secondary winding connected to said load, a polyphase primary winding inductively associated with said secondary polyphase winding, and a plurality of electron discharge devices, each of said electron discharge devices having an input circuit connected to a different phase of said polyphase circuit and an output circuit connected to a corresponding phase of said primary winding whereby polyphase electromotive force is supplied to said load and impedance changes in said load are prevented from affecting said phase relation controlling means.

7. In combination a polyphase load, means for supplying radio frequency polyphase currents to said load, said means including a single phase transformer having primary and secondary windings, a high frequency single phase source of current connected to said primary winding, a polyphase circuit connected to said secondary winding, a resistor in each branch of said polyphase circuit, means for varying the phase relation of the currents in said polyphase circuit, said means being subject to variation due to changes in the impedance of said circuit, a polyphase transformer having a secondary winding connected to said load and a polyphase primary winding inductively associated with said secondary polyphase winding, and a plurality of electron discharge devices, each of said discharge devices having an input circuit connected to a different one of said resistances and an output circuit connected to a corresponding phase of said polyphase primary winding whereby polyphase electromotive force is supplied to said load and impedance variations in said load are prevented from affecting said phase relation varying means.

8. In combination, a polyphase load, a source of single phase high frequency currents and means comprising a plurality of tuned circuits for converting said single phase currents into polyphase currents and for supplying said polyphase currents to said polyphase load.

9. In combination, a single phase transformer, having a primary winding and a secondary winding, means for supplying high frequency single phase current to the primary winding, a polyphase load circuit, a connection from an intermediate point on said secondary winding to one phase of said load circuit and connections from points on said secondary winding opposite said intermediate point to other branches of said polyphase load circuit and impedance elements in a plurality of said connections, at least one of said elements having capacity reactance, whereby polyphase current may be produced in said load circuit.

10. In combination, a source of single phase high frequency current, a polyphase load circuit, a plurality of impedance elements, one phase of said polyphase load circuit being connected to an intermediate point on said source and each of the other phases of said load circuit being connected through one of said impedance elements to opposite points on said source, at least one of said impedance elements having capacity reactance, and said impedance elements being adjusted to produce polyphase current in said load circuit.

11. In combination, a source of single phase electromotive force, a polyphase load, a connection from one phase of said load to an intermediate point on said source and other connections from different phases of said load to points on said source such that the potentials between said first connection and each of said other connections are displaced in phase, and means for controlling the phase relation between current in said connections whereby the instantaneous sum of said currents is substantially zero.

12. In combination, a single phase transformer having a primary winding and a secondary winding, means for supplying single phase electromotive force to said primary winding, a polyphase load, a connection between each phase of said load and different points on said secondary winding, and impedance elements in the connections to a plurality of said points, at least one of said impedance elements comprising capacity, whereby the instantaneous sum of currents in all of said connections is substantially zero.

13. In combination, a source of single phase electromotive force, a substantially non-inductive polyphase load, a connection from one phase of said load to an intermediate point on said source and connections from other phases of said load to opposite points on said source whereby the potentials between said first connection and each of the other connections are displaced in phase, an additional polyphase load, means for supplying polyphase electromotive force from said non-inductive load to said additional load and reactive impedances in certain of said connections for controlling the phase relation between the electromotive forces supplied to said additional load.

14. In combination, a source of single phase electromotive force, a substantially non-inductive polyphase load, a connection from one phase of said load to an intermediate point on said source, and connections from other phases of said load to opposite points on said source whereby the potentials between said first connection and each of the other connections are displaced in phase, an additional polyphase load, means for supplying polyphase electromotive force from said first load to said additional load, reactive impedances in certain of said connections for controlling the phase relation between currents in said first load, and means for rendering the potentials on said first load substantially independent of the impedances of said additional load.

In witness whereof, I have hereunto set my hand this 17th day of April 1925.

EMMETT F. CARTER.